United States Patent
Yamaguchi et al.

(10) Patent No.: US 8,976,518 B2
(45) Date of Patent: Mar. 10, 2015

(54) ELECTRONIC APPARATUS

(71) Applicant: Fujitsu Limited, Kawasaki-shi, Kanagawa (KR)

(72) Inventors: Goki Yamaguchi, Kawasaki (JP); Masuo Ohnishi, Hachioji (JP)

(73) Assignee: Fujitsu Limited, Kawasaki (JP)

( * ) Notice: Subject to any disclaimer, the term of this patent is extended or adjusted under 35 U.S.C. 154(b) by 181 days.

(21) Appl. No.: 13/714,695

(22) Filed: Dec. 14, 2012

(65) Prior Publication Data

US 2013/0155591 A1  Jun. 20, 2013

(30) Foreign Application Priority Data

Dec. 20, 2011 (JP) .................................. 2011-278939

(51) Int. Cl.
*G06F 1/16* (2006.01)

(52) U.S. Cl.
CPC ..................................... *G06F 1/1626* (2013.01)
USPC ......... 361/679.26; 429/99; 455/411; 320/132

(58) Field of Classification Search
CPC ....................................................... G06F 1/16
USPC .............. 439/625, 345, 630, 607.1, 325, 637;
429/100, 99, 98, 61, 90, 7, 94, 159,
429/178, 162; 361/679.45, 679.4, 679.6,
361/679.27, 679.28, 679.21, 679.12,
361/679.56, 679.41, 679.08, 679.06,
361/679.02, 814, 679.3, 679.09, 794;
455/426.1, 420, 552.1, 411, 566.1,
455/566; 320/106, 112, 107, 132, 134, 108
See application file for complete search history.

(56) References Cited

U.S. PATENT DOCUMENTS

| | | | |
|---|---|---|---|
| 8,373,979 B2 * | 2/2013 | Hamada et al. | 361/679.27 |
| 2002/0006750 A1 * | 1/2002 | Hidesawa | 439/625 |
| 2003/0227443 A1 | 12/2003 | Kyouzuka et al. | |
| 2011/0189519 A1 * | 8/2011 | Kohmoto et al. | 429/100 |

FOREIGN PATENT DOCUMENTS

| | | |
|---|---|---|
| JP | 08-076887 A | 3/1996 |
| JP | 2004-013843 A | 1/2004 |

* cited by examiner

*Primary Examiner* — Hung Duong
(74) *Attorney, Agent, or Firm* — Maschoff Brennan

(57) ABSTRACT

There is provided an electronic apparatus which includes a rectangular apparatus body including a display unit, and a battery pack including a battery cell incorporated therein and including a rounded outer shape, wherein the battery pack is mounted on one side of the apparatus body in an arrangement in which the display unit and the battery cell do not overlap with each other.

11 Claims, 13 Drawing Sheets

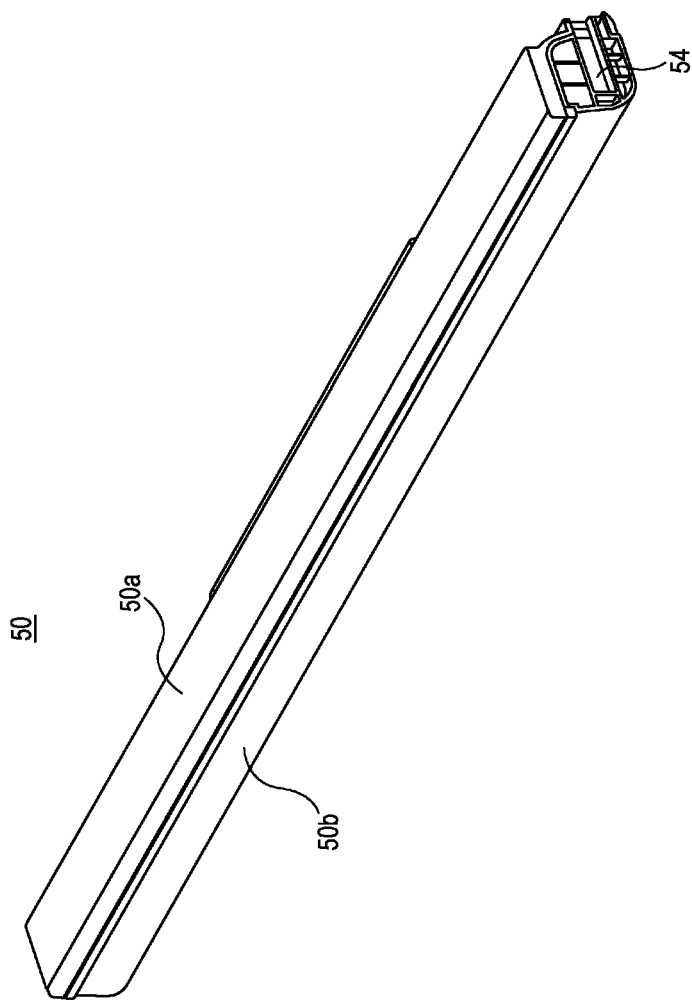

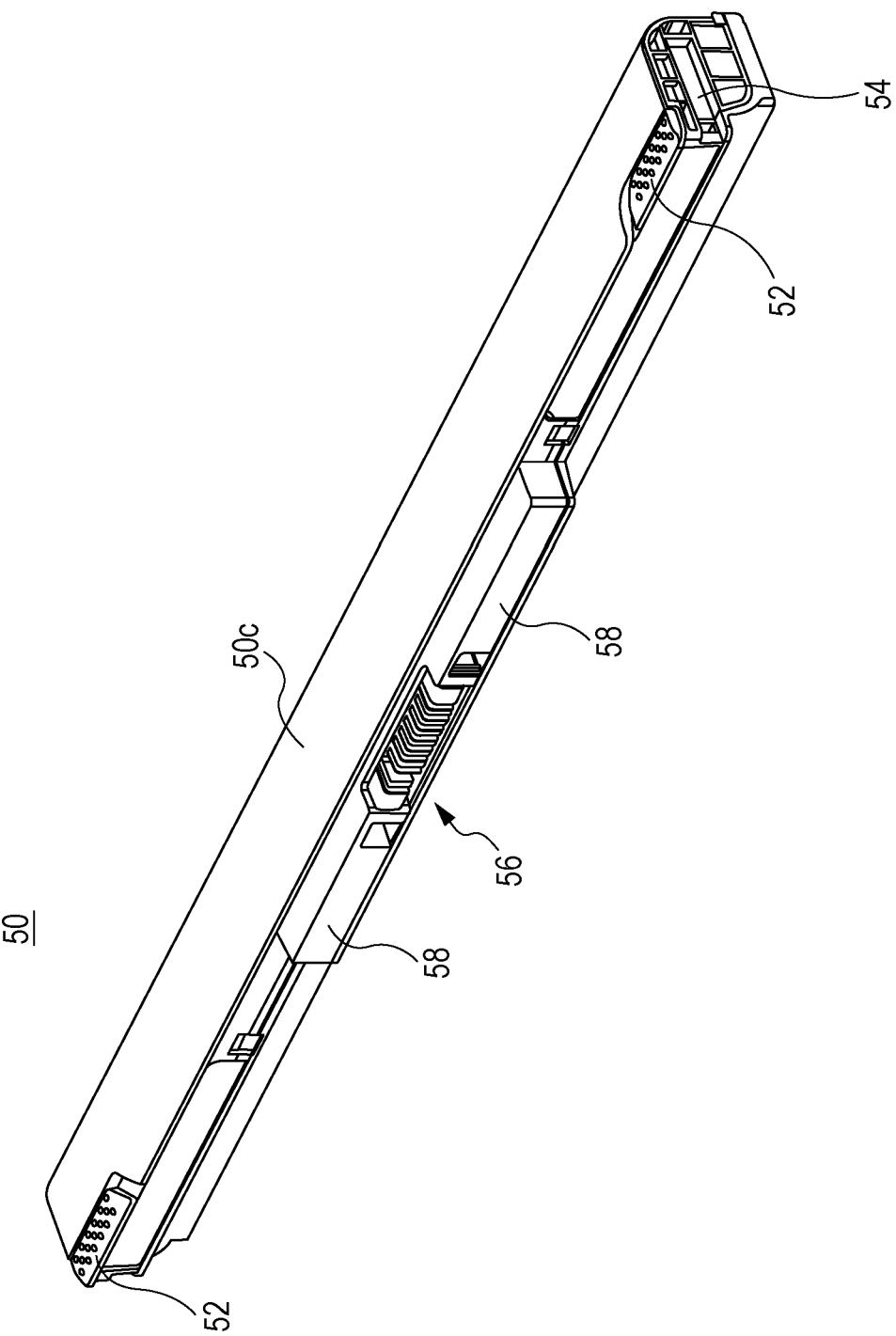

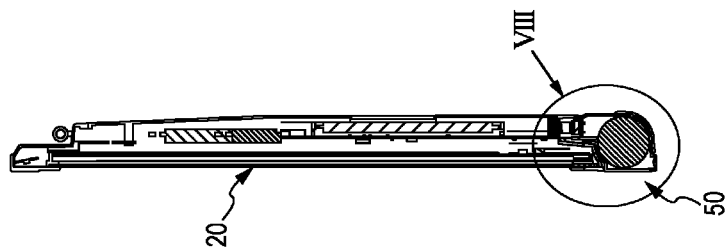
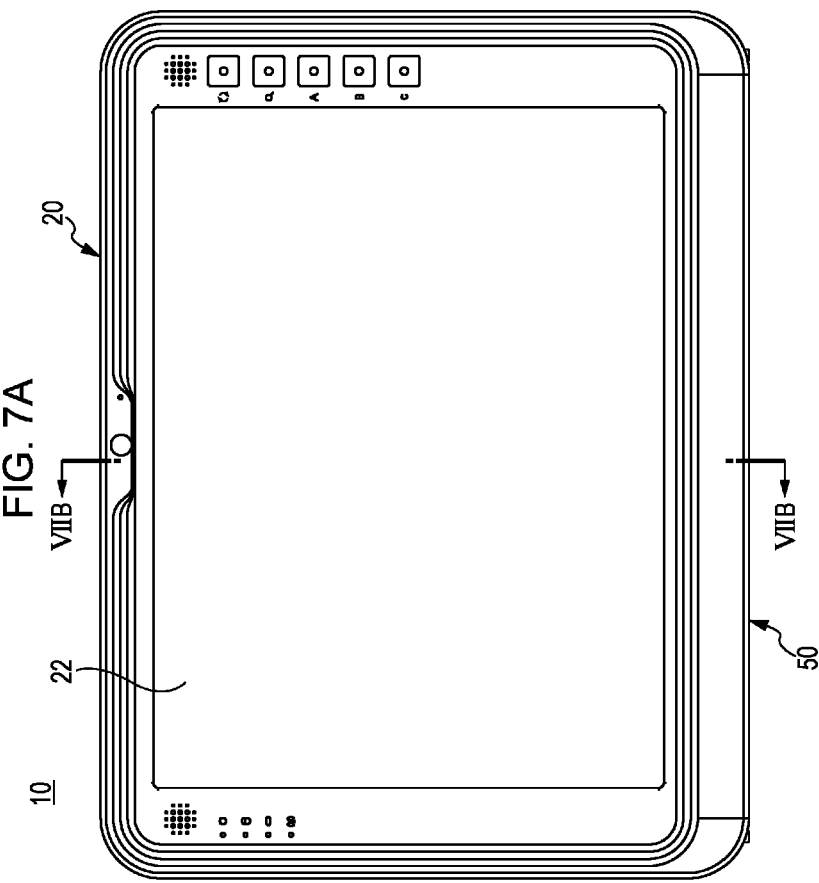

ELECTRONIC APPARATUS

CROSS-REFERENCE TO RELATED APPLICATION

This application is based upon and claims the benefit of priority of the prior Japanese Patent Application No. 2011-278939, filed on Dec. 20, 2011, the entire contents of which are incorporated herein by reference.

FIELD

The embodiment discussed herein is related to an electronic apparatus driven by using a battery.

BACKGROUND

It is known that mobile terminals as handheld computers, represent by tablet terminals, includes a touch panel display mounted on a flat panel shaped body surface. In other words, the tablet terminals have a rectangular flat panel shape. Most of the surface of such tablet terminal is occupied by a display and input device. As the display and input device, the tablet terminal includes a touch panel display which is capable of displaying images and allows touch input. In order to use the tablet terminal as a mobile device, a battery is used as a drive source. Therefore, the tablet terminal includes a battery pack incorporated therein.

Japanese Laid-open Patent Publication No. 08-76887 and Japanese Laid-open Patent Publication No. 2004-13843 are examples of the related art.

Tablet terminals including a rectangular planar shape as a whole may be used either in a horizontally oriented position or a vertically oriented position. The tablet terminals allow users to hold in one hand or to support with one arm and operate with the other hand.

When a user carries such tablet terminal or operates the tablet terminal while holding it with the arm, the user holds part of the tablet terminal with the hand. The tablet terminals have a simple rectangular flat panel shape in many cases, and users are allowed to hold any part of the tablet terminals. When a user holds a peripheral portion of the tablet terminal, for example, if the portion that the user holds is angular and includes a shape difficult to be held, the user may have an impression that the tablet terminal is not user-friendly. In addition, depending on the relationship between the holding portion and the position of center of gravity of the tablet terminal, the force to hold the tablet terminal may be larger than expected.

SUMMARY

According to an aspect of the invention, an electronic apparatus includes a rectangular apparatus body including a display unit, and a battery pack including a battery cell incorporated therein and including a rounded outer shape, wherein the battery pack is mounted on one side of the apparatus body in an arrangement in which the display unit and the battery cell do not overlap with each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a perspective view of the battery pack from the front side thereof;

FIG. 6 is a perspective view of the battery pack viewed from the back side thereof;

FIG. 7A is a plan view illustrating the tablet terminal and FIG. 7B is a cross-sectional view taken along the line VIIB-VIIB in FIG. 7A;

DESCRIPTION OF EMBODIMENT

Description of embodiments will be given with reference to drawings.

Figure 1:
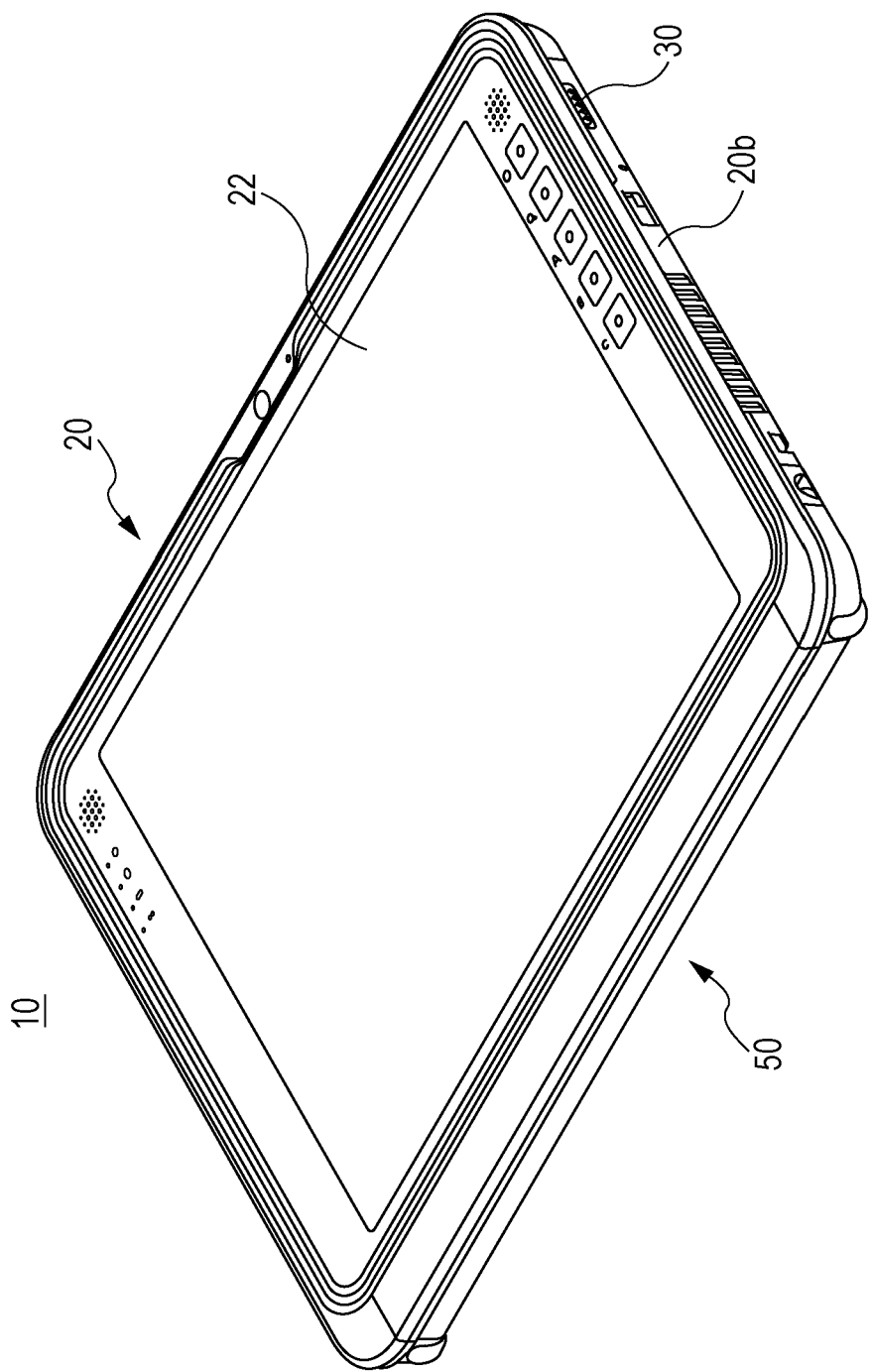
FIG. 1 is a perspective view of a tablet terminal, illustrating an example of an electronic apparatus according to an embodiment.
Figure 2:
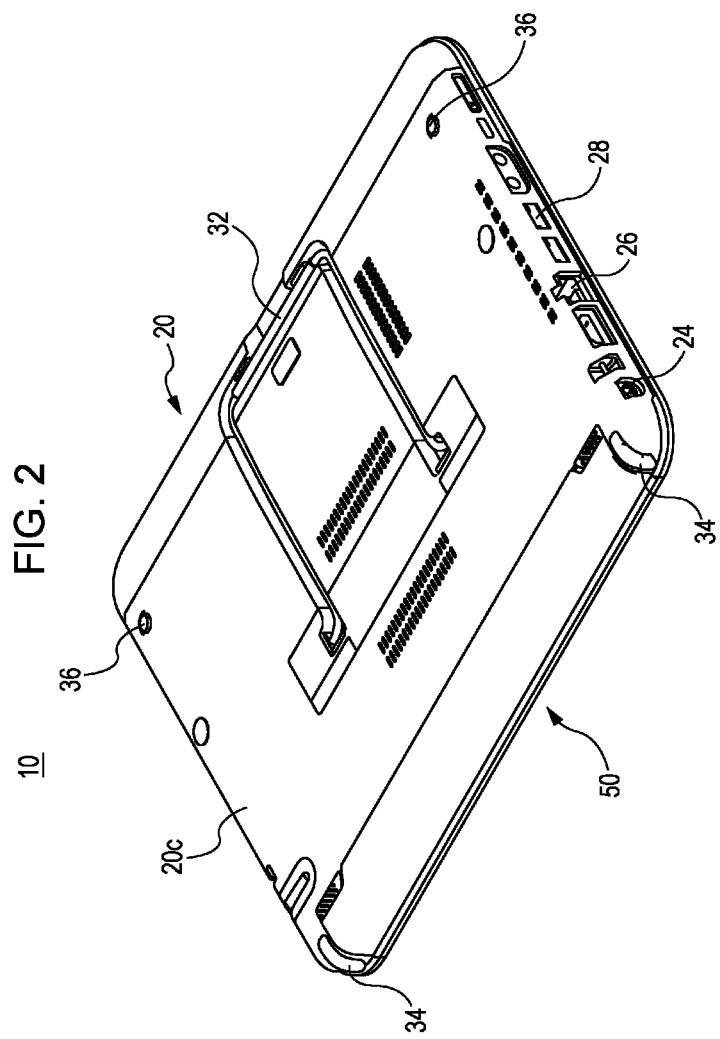
FIG. 2 is a perspective view of the tablet terminal illustrated in FIG. 1 viewed from the back side thereof.
Figure 3:
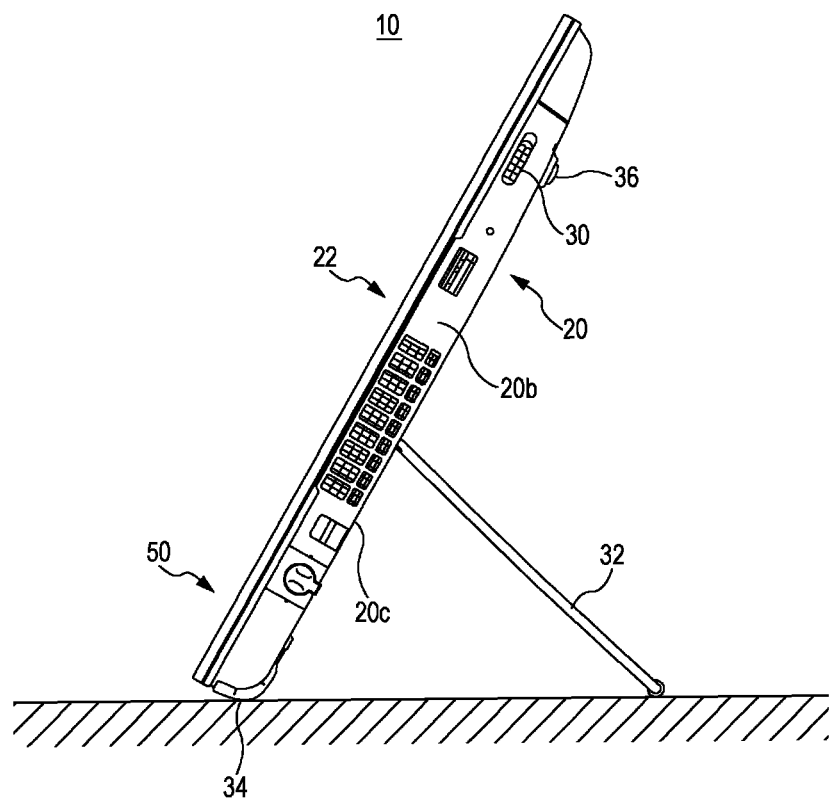
FIG. 3 is a side view of the tablet terminal illustrated in FIG. 1.

FIG. 1 is a perspective view illustrating a tablet terminal that is an example of an electronic apparatus according to an embodiment. FIG. 2 is a perspective view of the tablet terminal illustrated in FIG. 1 viewed from the back side thereof. FIG. 3 is a side view of the tablet terminal illustrated in FIG. 1.

A tablet terminal 10 illustrated in FIG. 1 is an example of an electronic apparatus according to the embodiment. However, the electronic apparatus of the embodiment is not limited to the tablet terminal, but may be applied to any types of the electronic apparatus as long as users are allowed to use the electronic apparatus while holding it with the hand.

The tablet terminal 10 includes an apparatus body 20 and a battery pack 50. The battery pack 50 is mounted on one side of the apparatus body 20 so as to be demountable as desired. In a state in which the battery pack 50 is mounted on the apparatus body 20, the general planar shape of the tablet terminal 10 is a rectangular shape. The battery pack 50 is arranged on one of long sides of the tablet terminal 10 and is mounted thereon. When arranging the battery pack 50 on the long side of the tablet terminal 10, a battery cell including a large capacity may be incorporated into the battery pack 50 to have an increased capacity. Furthermore, by arranging the battery pack 50 on the long side of the tablet terminal 10, stability of the tablet terminal 10 when used by being supported by a stand in a vertical position as described later may be increased.

As illustrated in FIG. 1, a rectangular-shaped touch panel 22 is provided as a display device or an operating device on the front side of the apparatus body 20. A portion surrounding the touch panel 22 is formed into a frame shape by the apparatus body 20 and the battery pack 50. The touch panel 22 functions as a liquid-crystal display (LCD) configured to display various images and information and functions also as an input device that the user inputs information by touching a screen thereof.

Various connectors such as a power source connector 24, a LAN connector 26, and a USB connector 28 and terminals are provided on one side portion on one of the short sides of the apparatus body 20 as illustrated in FIG. 2. A switch such as a power switch 30 and connectors are provided on a side portion on the other short side of the apparatus body 20. The side portions on the short sides of the apparatus body 20 are portions which correspond to side portions when a stand 32 is taken out from the back side of the apparatus body 20 and the tablet terminal 10 is arranged upright with the side where the battery pack 50 is provided located on the downside as illustrated in FIG. 3. Therefore, the connectors, the terminals, and the switches are provided on the side portions on the short sides of the apparatus body 20. In this manner, by arranging the tablet terminal 10 so that the battery pack 50 is located on the downside in the direction of gravitational force when supporting the tablet terminal 10, the connectors may be arranged on the side surfaces of the tablet terminal 10, whereby user friendliness is improved.

When the tablet terminal 10 is placed upright using the stand 32, the battery pack 50 is located on the downside in the direction of gravitational force. Therefore, a pair of supporting members 34 is provided at positions on the long side of the apparatus body 20 where the battery pack 50 is mounted so as to be interposed therebetween. The supporting members 34 are formed, for example, of an elastic body commonly referred to as silicon rubber, polyester elastomer, two-color mold or the like. The supporting members 34 project downward compared to the battery pack 50 so that the supporting members 34 come into abutment with a desk surface when the tablet terminal 10 is placed on the desk with the battery pack 50 on the downside. The shape of the supporting members 34 will be described later.

The tablet terminal 10 may be placed on the desk in a horizontal position with the touch panel 22 facing upward as illustrated in FIG. 1. When the tablet terminal 10 is placed in such a position, the back surface illustrated in FIG. 2 faces the desk surface. In this case, on the side of the tablet terminal 10 where the battery pack 50 is mounted, the supporting member 34 comes into abutment with the desk surface and on the opposite side thereof, a pair of supporting pads 36 come into abutment with the desk surface. In other words, when placing the tablet terminal 10 on the desk with the back side thereof facing downward, the tablet terminal 10 is supported on the desk with the pair of the supporting members 34 and the pair of supporting pads 36. The supporting pads 36 are formed of an elastic body commonly referred to as silicon rubber, polyester elastomer, two-color mold or the like in the same manner as the supporting members 34.

Since the stand 32 is accommodated in a depressed portion formed on a back surface of the apparatus body 20 as illustrated in FIG. 2, the stand 32 is configured not to project downward with respect to the supporting members 34 and the supporting pads 36 when the tablet terminal 10 is placed on the desk with the back surface of the apparatus body 20 facing downward. When the tablet terminal 10 is placed in the upright position on the desk like a photo frame, the stand 32 is rotated to be pulled out from the depressed portion formed on the back surface of the apparatus body 20 as illustrated in FIG. 3, and the stand 32 is used as a support. At this time, the tablet terminal 10 is supported in a state in which the battery pack 50 is located on the downside in the direction of gravitational force as described above, and the supporting members 34 come into abutment with the desk surface.

The battery pack 50 is a relatively heavy component among components of the tablet terminal 10. Therefore, the tablet terminal 10 may be placed on the desk in a stable state by locating the battery pack 50 on the downside in the direction of gravitational force. Since the supporting members 34 are provided on the side where the battery pack 50 is mounted, the user may recognize easily that the side where the supporting members 34 are provided is the downside. In other words, the user may be free from thinking which side of the tablet terminal 10 is to be placed on the downside considering the weight of the battery pack 50, and may recognize easily that the tablet terminal 10 is to be arranged in a position in which the supporting members 34 are located on the downside. Consequently, the user may place the tablet terminal 10 in a position in which the heavy battery pack 50 is located on the downside without specifically considering the weight.

In a case where the user holds the tablet terminal 10 in the arm by gripping one of the side surfaces thereof (that is, one of the short sides), since the battery pack 50 comes into abutment with the inner side of the elbow, the tablet terminal 10 may be gripped stably.

The battery pack 50 will be described with reference to FIG. 4 to FIG. 8.

Figure 4:
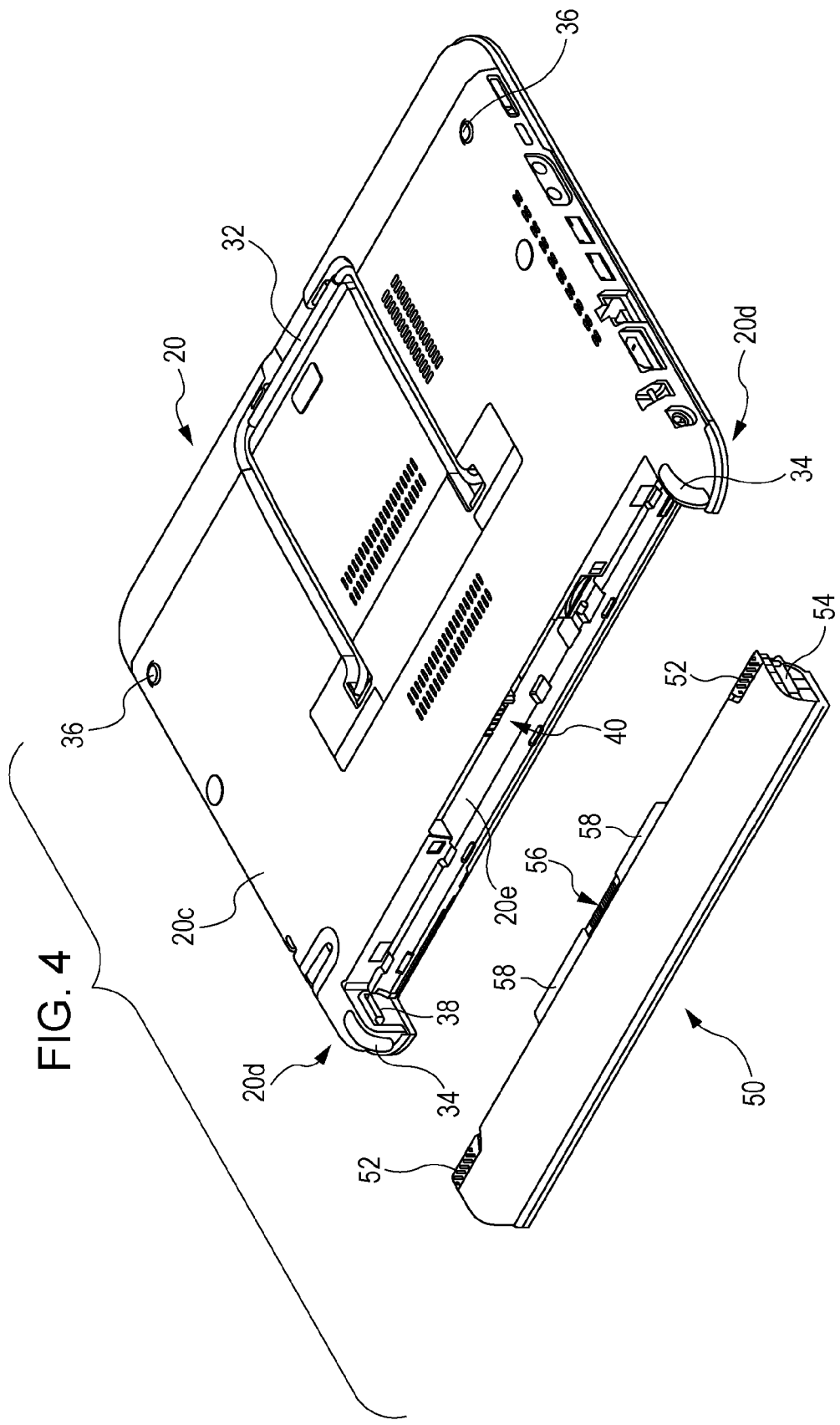
FIG. 4 is a perspective view of the tablet terminal when viewed from the back side thereof, illustrating a state in which a battery pack is detached from an apparatus body.

FIG. 4 is a perspective view of the tablet terminal 10 when viewed from the back side, illustrating a state in which the battery pack 50 is detached from the apparatus body 20. When detaching the battery pack 50 from the apparatus body 20, the battery pack 50 may be pulled apart from the apparatus body 20 while sliding inward slide knobs 52 provided at both end portions of the battery pack 50 in the longitudinal direction. By sliding the slide knobs 52 inward, the battery pack 50 fixed to the apparatus body 20 by an engaging mechanism is released from the apparatus body 20, and hence engagement between the battery pack 50 and the apparatus body 20 is released. As the engaging mechanism, known mechanisms may be employed, and, therefore, detailed description thereof is omitted.

The length (the dimension in the longitudinal direction) of the battery pack 50 is set to be shorter than the length of the long side of the apparatus body 20, and both end portions 20d of the long side where the battery pack 50 of the apparatus body 20 is mounted project so as to hold the battery pack 50 from the both sides in the longitudinal direction. In other words, one of the long sides of the apparatus body 20 is cut away corresponding to the shape of the battery pack 50. By fitting the battery pack 50 into the cut-away portion of the apparatus body 20, the tablet terminal 10 becomes a rectangular shape as a whole.

FIG. 5 is a perspective view of the battery pack 50 viewed from the front side thereof. A front surface 50a of the battery pack 50 is a surface which corresponds to part of a surface of the tablet terminal 10 on the front side, and is formed into a flat surface. The front surface 50a of the battery pack 50 is a portion more visible to the user, so that a logo mark or a special design may be provided on the front surface 50a.

A side surface 50b of the battery pack 50 is a surface which corresponds to part of a side surface of the tablet terminal 10, and includes a shape conformed to the design of a side surface 20b of the apparatus body 20. In the embodiment, the side surface 50b of the battery pack 50 continues to a back surface while forming a gentle curved surface.

FIG. 6 is a perspective view of the battery pack 50 viewed from the back side thereof. A back surface 50c of the battery pack 50 is provided with the slide knobs 52 at the both end portions in the longitudinal direction as described above. Slots 54 configured to fit to projecting portions 38 (see FIG. 4) formed on the apparatus body 20 are formed at both ends of the battery pack 50 in the longitudinal direction. When mounting the battery pack 50 on the apparatus body 20, the slots 54 at the both ends of the battery pack 50 in the longitudinal direction are fit to the projecting portions 38 of the apparatus body 20, thereby positioning the battery pack 50 with respect to the apparatus body 20. In a state in which the battery pack 50 is mounted on the apparatus body 20, projecting portions 58 of the battery pack 50 are supported by the apparatus body 20, so that the battery pack 50 is fixed so as not to move in the direction of the thickness of the tablet terminal 10. In the embodiment, a structure not to allow the battery pack 50 to move in the direction of the thickness of the tablet terminal 10 is provided separately from the fitting between the slots 54 and the projecting portions 38. The structure will be described later.

The battery pack 50 is a power source configured to supply power to the apparatus body 20, and a connector 56 including electric connection terminals is connected to a connector 40 of the apparatus body 20 in a state in which the battery pack 50 is mounted on the apparatus body 20.

Figure 8:
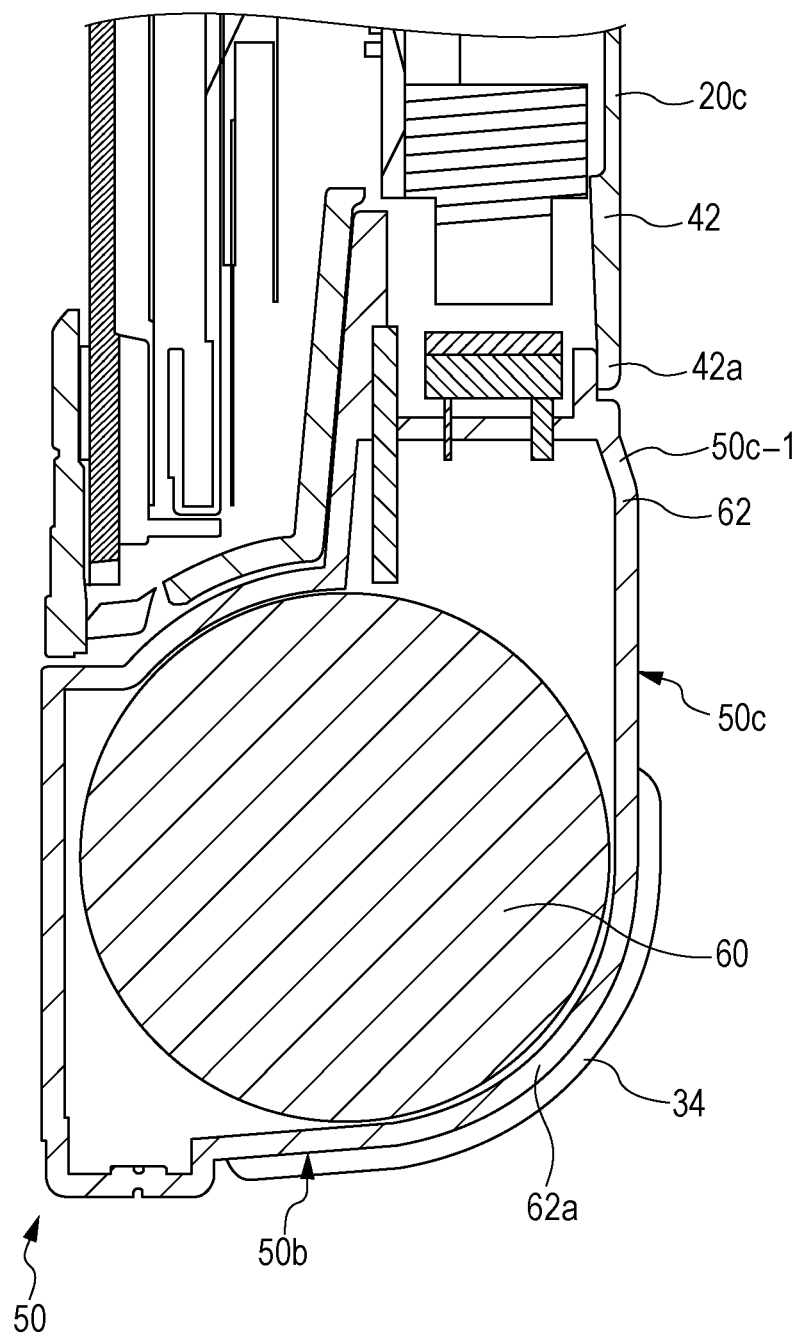
FIG. 8 is an enlarged view of a portion VIII illustrated in FIG. 7B.

FIG. 7A is a plan view of the tablet terminal 10, and FIG. 7B is a cross-sectional view taken along the line VIIB-VIIB in FIG. 7A. FIG. 8 is an enlarged view of a portion VIII illustrated in FIG. 7B. The portion VIII illustrated in FIG. 8 includes part of the battery pack 50 and part of the apparatus body 20 on which the battery pack 50 is mounted.

The battery pack 50 includes a housing 62 defining the front surface 50a, the side surface 50b, and the back surface 50c described above, and a battery cell 60 is accommodated in the housing 62. The battery cell 60 includes an elongated cylindrical shape extending in the longitudinal direction of the battery pack 50, and the cross-section of the battery cell 60 includes a circular shape as illustrated in FIG. 8. A portion of the housing 62 defining a portion from the side surface 50b to the back surface 50c of the battery pack 50 is formed as a curved surface portion 62a rounded so as to follow the cross-sectional shape (circular shape) of the battery pack 50.

The curved surface portion 62a of the battery pack 50 is a portion connecting the side surface 50b and the back surface 50c of the battery pack 50, and is a curved surface including a curvature significantly larger than the curvature of a corner portion connecting the front surface 50a and the side surface 50b of the battery pack 50. Also, the curved surface portion 62a includes a curved surface including a curvature larger than the curvature of a portion connecting the side surface 20b and a back surface 20c of the apparatus body 20.

Providing the curved surface portion 62a allows the user to grip the battery pack 50 easily by hand. When gripping the tablet terminal 10, the user first thinks which part of the tablet terminal 10 he/she is going to grip. At this time, users typically think to grip a part including no corner portion which may come into strong contact with the palm of the hand when the tablet terminal 10 is held by the palm of the hand. Therefore, the user spontaneously selects the battery pack 50 as a portion to grip the tablet terminal 10 according to the embodiment. In other words, the curved surface portion 62a of the housing 62 of the battery pack 50 is formed into a curved surface including a curvature gentler and larger than the curvature of other portions of the apparatus body 20, and includes a shape encouraging the user to grip the curved surface portion 62a so as to come into contact with the palm of the hand.

When the user grips the battery pack 50 with the palm of the hand, the user puts the thumb on the side of the front surface 50a of the battery pack 50, and other four fingers on the side of the back surface 50c of the battery pack 50, so that the battery pack 50 is gripped between the thumb and other four fingers. Then, the curved surface portion 62a of the battery pack 50 is brought into a state of being naturally held by the palm of the hand, and hence the user is allowed to easily grip the battery pack 50 integrally mounted to the tablet terminal 10.

The battery pack 50 is a heavy component among the components of the tablet terminal 10, and hence the center of gravity of the entire tablet terminal 10 is located near the battery pack 50. Therefore, by gripping the battery pack 50, the user is allowed to hold the tablet terminal 10 stably with a gripping force smaller than in the case of gripping a portion of the tablet terminal 10 where the portion is positioned away from the battery pack 50.

As described above, providing the curved surface portion 62a allows the user to select the portion to grip easily and allows the user to grip the curved surface portion 62a with the palm of the hand easily and stably.

Because the cylindrical battery cell 60 is employed, the curved surface portion 62a is formed into a surface including a large curvature. In the embodiment, although the curvature of the curved surface portion 62a is selected to correspond to the curvature of the cross-sectional shape (circular shape) of the battery cell 60. However, the curved surface portion 62a may be a shape not accurately conforming to the shape of the battery cell, and may be a rounded shape which is easy to be held by the palm of the hand.

As illustrated in FIG. 8, there is formed a shoulder portion including a small level difference between the back surface 50c of the battery pack 50 and the back surface 20c of the apparatus body 20. The level difference is formed by an inclined surface 50c-1 which is a slightly inclined part of the back surface 50c of the battery pack 50. When the user grips the battery pack 50, the four fingers other than the thumb are located on the back side of the battery pack 50. At this time, by placing fingertips of the four fingers on the shoulder portion, the user is allowed to grip the battery pack 50 more easily.

In the embodiment, the shoulder portion is formed by the inclined surface 50c-1 provided on the back surface 50c of the battery pack 50. However, the shoulder portion may be formed using other structures. For example, a projection or a depressed portion may be provided on the back surface 20c of the apparatus body 20 or the back surface 50c of the battery pack 50 to form a shoulder portion extending along a part where the battery pack 50 is attached to the apparatus body 20.

In the embodiment, when the battery pack 50 including the battery cell 60 incorporated therein is mounted on the one side of the apparatus body 20, the touch panel 22 as a display device integrated in the apparatus body 20 and the battery cell 60 incorporated into the battery pack 50 are arranged side by side so as not to overlap with each other. Accordingly, the thickness of the tablet terminal 10 may be reduced to a thickness equal to or smaller than the thickness of the battery pack 50 or the thickness of the apparatus body 20, so that the thickness of the tablet terminal 10 may be reduced.

In the configuration in which the battery pack 50, instead of the apparatus body 20, is configured to be gripped as described above, a significant force may be applied to a connecting portion between the battery pack 50 and the apparatus body 20. The connecting portion in the embodiment is designed to resist such a significant force, so that the battery pack 50 is not detached from the apparatus body 20 even though the tablet terminal 10 is used rather roughly while griping the battery pack 50. However, when an impact is applied to the apparatus body 20 in a state of gripping the battery pack 50, the battery pack 50 and the apparatus body 20 slightly move with respect to each other, and hence the electrical connection terminals at the electrical connecting portions (connectors) have a loose connection, so that the electrical conduction may be temporarily blocked (instantaneously interrupted).

Therefore, in the embodiment, the instantaneous interruption in the connectors may be reliably reduced by employing the structure described below.

First, a structure is employed in which a housing 42 that forms the back surface 20c of the apparatus body 20 includes a protruding portion 42a protruding so as to cover the connector 56 of the battery pack 50 (see FIG. 8) in a state in which the connector 56 of the battery pack 50 is connected to the connector 40 of the apparatus body 20.

Figure 9:
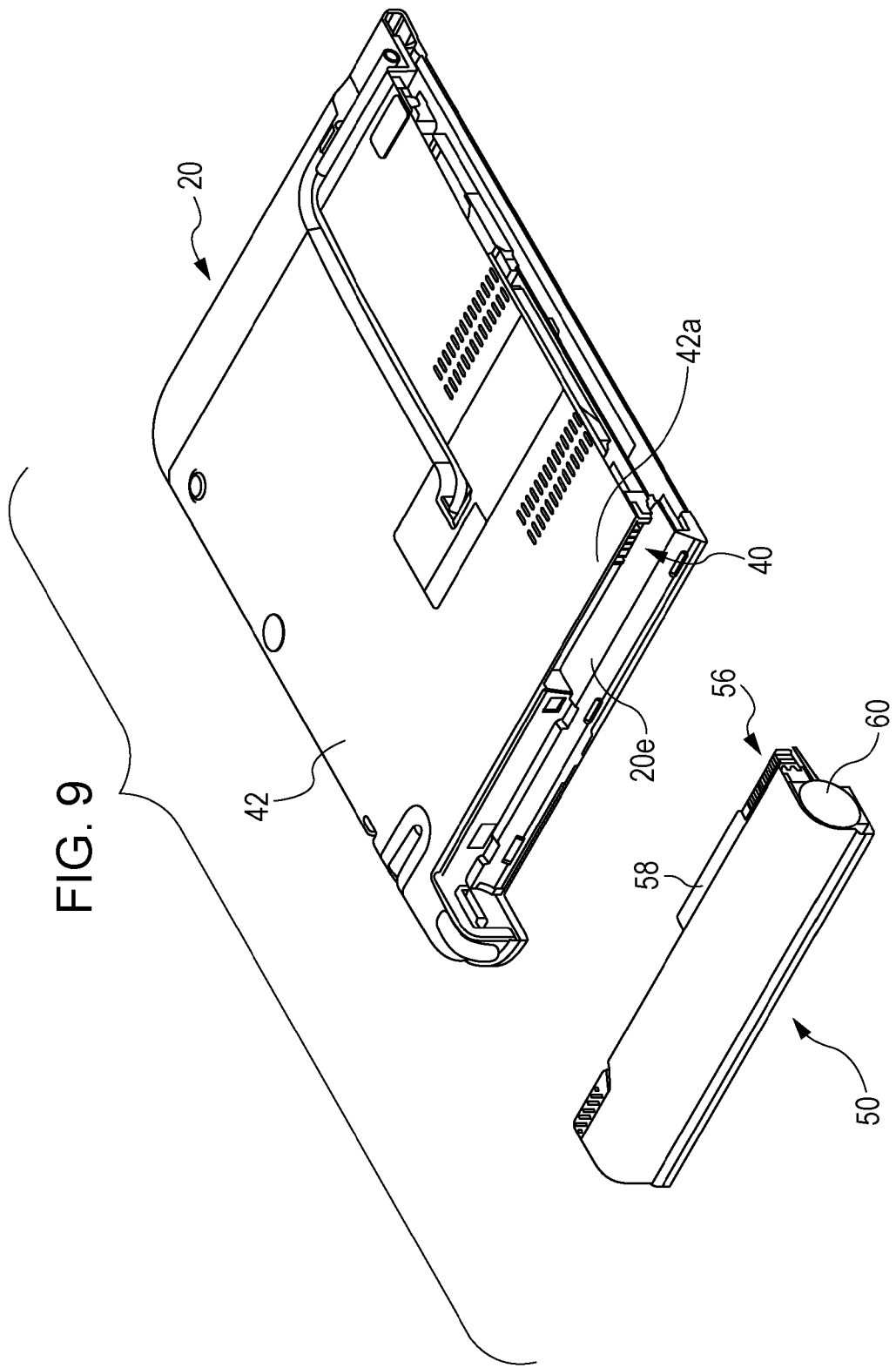
FIG. 9 is a perspective view of the table terminal in a state in which the battery pack is detached, illustrating a state of being cut at the center thereof.

FIG. 9 is a perspective view of the table terminal 10 in a state in which the battery pack 50 is detached, illustrating a state of being cut at the center thereof. The apparatus body 20 includes a depressed portion 20e configured to receive the connector 56 of the battery pack 50 and the projecting portions 58 in the vicinity thereof, and the connector 56 is accommodated in the depressed portion 20e in the state in which the connector 56 is connected to the connector 40. The protruding portion 42a described above is a portion protruding so as to allow part of the housing 42 of the apparatus body 20 to form the depressed portion 20e.

In a state in which the connector 56 of the battery pack 50 is connected to the connector 40 of the apparatus body 20, the connector 56 and the projecting portions 58 are accommodated in the depressed portion 20e, and fixed in a state of being clamped between the protruding portion 42a and an inner surface on the opposite side of the depressed portion 20e. Accordingly, the connector 56 is fixed firmly in the direction of the thickness of the tablet terminal 10, and the relative movement between the connector 56 and the connector 40 may be reduced even when a significant impact is applied in the direction of the thickness of the tablet terminal 10. Therefore, the probability that the instantaneous interruption occurs at the connecting portion between the connector 56 and the connector 40 due to the impact applied to the apparatus body 20 in the direction of the thickness of the tablet terminal 10 may be reduced.

According to the embodiment, the relative movement between the connector 56 and the connector 40 may be reduced in the longitudinal direction of the battery pack 50 as well. In a state in which the connector 56 and the projecting portions 58 of the battery pack 50 are accommodated in the depressed portion 20e of the apparatus body 20, the projecting portions 58 on the both sides of the connector 56 are brought into abutment with end surfaces of the depressed portion 20e in the longitudinal direction of the battery pack 50. Accordingly, the projecting portions 58 and the connector 56 are fixed in the longitudinal direction of the battery pack 50, and hence the relative movement between the connector 56 and the connector 40 may be reduced even when a large impact is applied in the longitudinal direction of the battery pack 50 of the tablet terminal 10. Therefore, the probability that the instantaneous interruption occurs at the connecting portion between the connector 56 and the connector 40 due to the impact applied to the apparatus body 20 in the longitudinal direction of the battery pack 50 may be reduced.

In the embodiment, the connector 40 of the apparatus body 20 is arranged at a central portion of one side of the apparatus body 20 where the battery pack 50 is mounted. Therefore, the connector 56 of the battery pack 50 is also arranged at a central portion of the battery pack 50 in the longitudinal direction. In this manner, in the state in which the connector 40 and the connector 56 are connected, the connector connecting portion is arranged at the central portion of the one side of the apparatus body 20. When moment which causes the battery pack 50 and the apparatus body 20 to relatively rotate about the connector connecting portion is applied to the battery pack 50 or the apparatus body 20, the moment may be reduced because the connector connecting portion is arranged at the central portion of the one side of the apparatus body 20. However, the position of the connector connecting portion is not limited to the central portion of the one side of the apparatus body 20, and may be a portion near either one of the end portions of the one side of the apparatus body 20.

The relative movement between the connector 56 and the connector 40 in the longitudinal direction of the battery pack 50 may be reduced by causing the projecting portions 58 of the battery pack 50 to abut to the inner surface of the depressed portion 20e of the apparatus body 20. However, the relative movement between the connector 56 and the connector 40 may also be reduced by other members. For example, the relative movement between the connector 56 and the connector 40 may be reduced by providing ribs on the battery pack 50 and the apparatus body 20 so that the ribs come into abutment with each other when the connector 56 and the connector 40 are connected.

Figure 10:
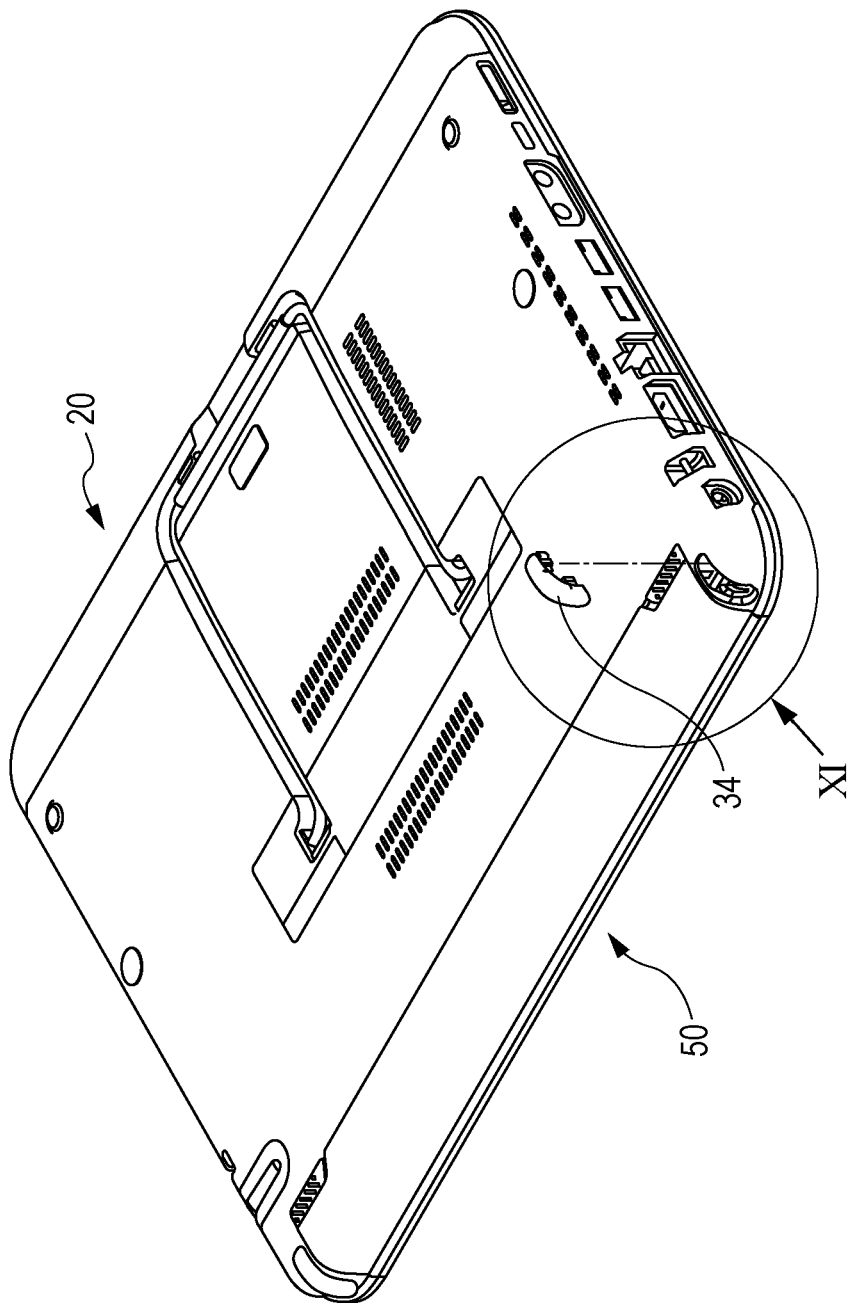
FIG. 10 is a perspective view of the tablet terminal viewed from the back side thereof, illustrating a state in which one of supporting members is detached.
Figure 11:
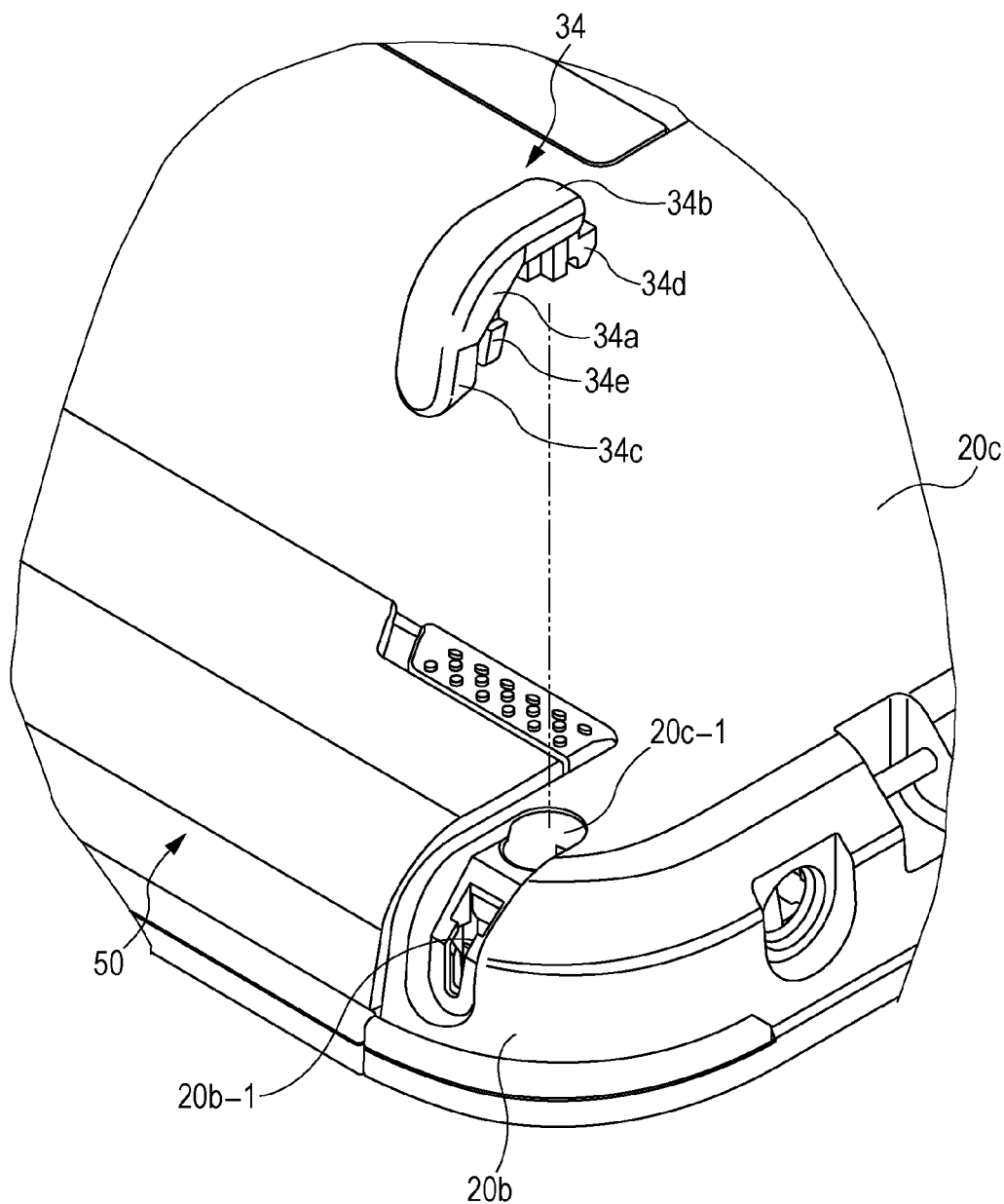
FIG. 11 is a drawing illustrating the portion XI in FIG. 10 in an enlarged scale.
Figure 12:
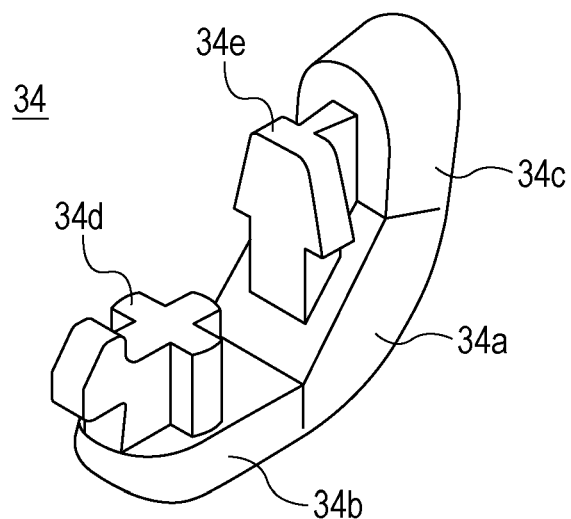
FIG. 12 is a perspective view of the supporting member viewed from the back side thereof.
Figure 13:
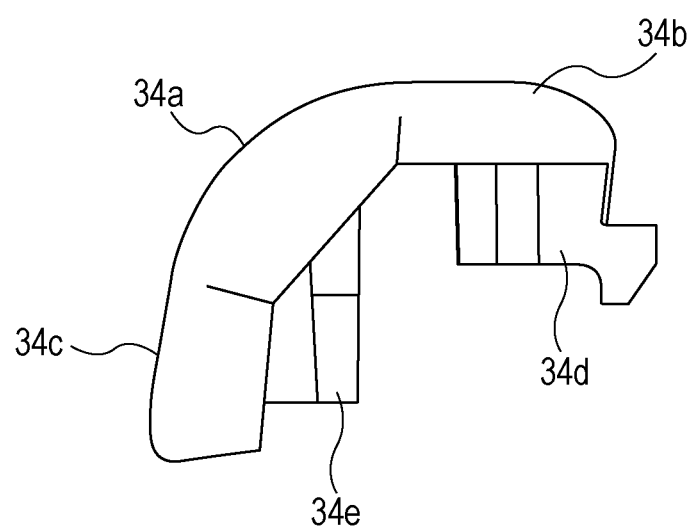
FIG. 13 is a side view of the supporting member.

The shape of the supporting member 34 of the tablet terminal 10 according to the embodiment will be described. FIG. 10 is a perspective view of the tablet terminal 10 when viewed from the back side, illustrating a state in which one of the supporting members 34 is detached. FIG. 11 is a drawing illustrating the portion XI in FIG. 10 in an enlarged scale. FIG. 12 is a perspective view of the supporting member 34 viewed from the back side thereof. FIG. 13 is a side view of the supporting member 34.

The supporting member 34 is formed of an elastic body such as silicon rubber and attached to the apparatus body 20. The supporting members 34 are attached to the end portions 20d provided so that the battery pack 50 of the apparatus body 20 is interposed therebetween. The supporting members 34 comes into abutment with the placement surface irrespective of whether the apparatus body 20 is placed in the horizontal position or in the upright position with the battery pack 50 located on the downside in the direction of gravitational force. In other words, the supporting members 34 each include a curved portion 34a curved by substantially 90 degrees so as to extend from the back surface 20c to the side surface 20b of the apparatus body 20. A back side straight portion 34b extends from one end side of the curved portion 34a, and a side straight portion 34c extends from the other end side.

The back side straight portion 34b is a portion projecting from the back surface 20c of the apparatus body 20 in a state in which the supporting member 34 is mounted on the apparatus body 20. Therefore, when the tablet terminal 10 is placed on the desk in the horizontal position, the tablet terminal 10 is supported with the back side straight portion 34b in abutment with the desk surface. The side straight portion 34c is a portion coming into abutment with the desk surface and supporting the tablet terminal 10 when the tablet terminal 10 is placed on the desk in the vertical position with the battery pack 50 side on the downside.

The curved portion 34a of the supporting member 34 includes a curved surface slightly projecting compared to the curved surface portion 62a of the housing 62 of the battery pack 50 when the supporting member 34 mounted on the apparatus body 20 is viewed in the lateral direction. Therefore, the curved portions 34a of the supporting members 34 come into abutment with the desk surface and support the tablet terminal 10 when the tablet terminal 10 is placed on the desk in the inclined position with the battery pack 50 side on the downside. The curved portion 34a of the supporting member 34 includes a curved shape conforming to the curved surface portion 62a of the battery pack 50, and parts of the curved portions 34a may adequately come into abutment with the desk surface irrespective of the angle of inclination of the tablet terminal 10 with respect to the direction of gravitational force between the horizontal position described above and the vertical position described above. Therefore, the tablet terminal 10 may be placed on the desk by using the curved portion 34a of the supporting member 34 and the stand 32 irrespective of the angle of inclination of the tablet terminal 10.

A back side insertion portion 34d is formed so as to project from the back side of the back side straight portion 34b of the supporting member 34. The back side insertion portion 34d is inserted into a back side mounting hole 20c-1 formed on the back surface 20c of the apparatus body 20. Further, a side insertion portion 34e is formed so as to project from the back side of the side straight portion 34c and the curved portion 34a of the supporting member 34. The side insertion portion 34e is inserted into a side surface mounting hole 20b-1 formed on the side surface 20b of the apparatus body 20. When the back side insertion portion 34d is pressed into the back side mounting hole 20c-1 and the side insertion portion 34e is pressed into the side surface mounting hole 20b-1, the supporting member 34 is fixed by being mounted reliably on the apparatus body 20.

As described above, the supporting members 34 are fixed reliably to the apparatus body 20 and, irrespective of the angle of inclination of the position of the tablet terminal 10 when being placed, the supporting members 34 may come into abutment with the desk surface reliably under the same conditions. Accordingly, the tablet terminal 10 may be reliably supported irrespective of the angle of inclination of the position of the tablet terminal 10 when being placed.

Figure 14:
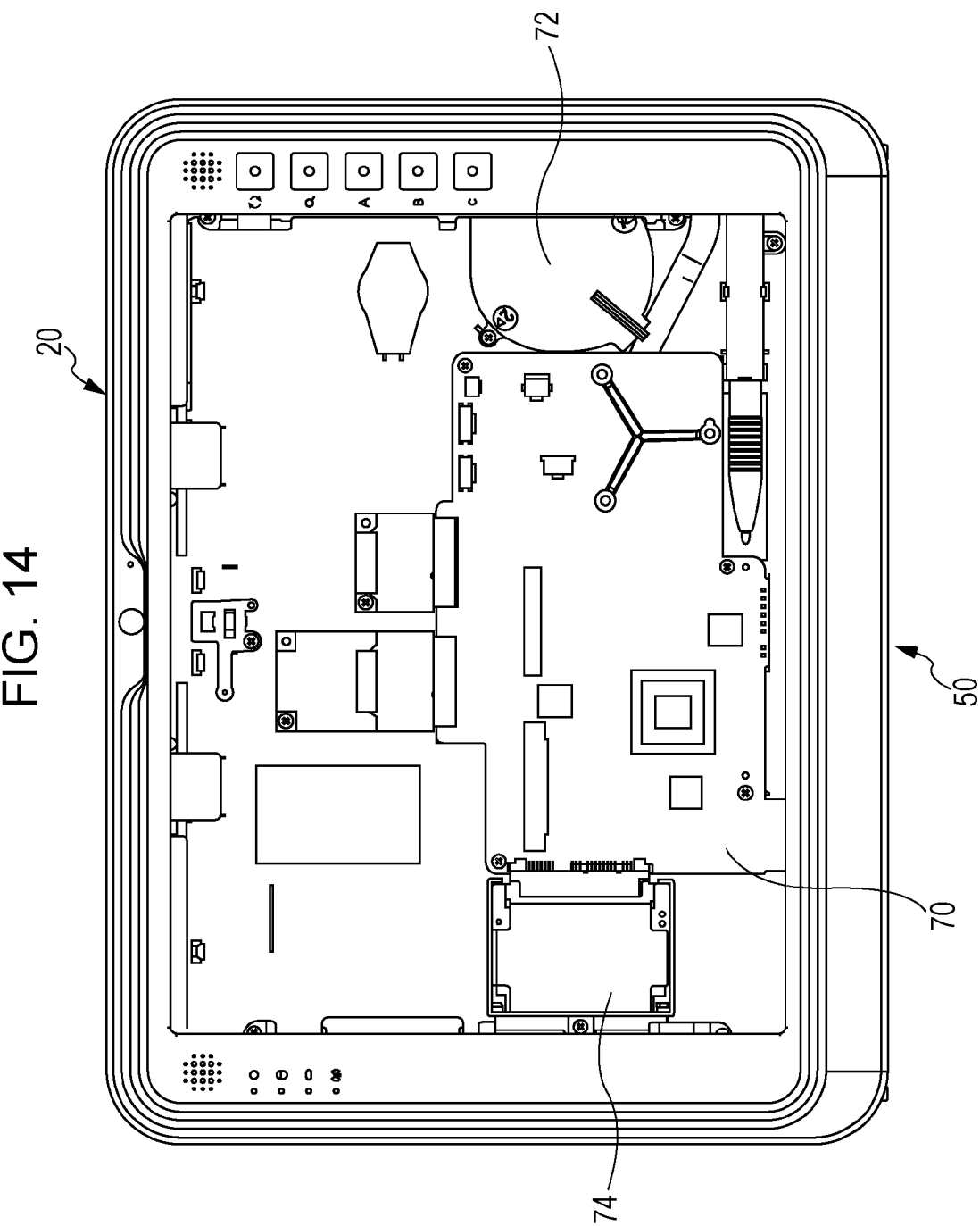
FIG. 14 is a plan view of the tablet terminal illustrating a state in which a touch panel and an LCD are removed.

The position of center of gravity of the tablet terminal 10 will be described. FIG. 14 is a plan view of the tablet terminal 10, illustrating a state in which the touch panel 22 and the LCD are removed. In FIG. 14, an arrangement of the components in the interior of the apparatus body 20 is illustrated. Relatively heavy components such as a main circuit board 70, a cooling device 72, and an outer connecting circuit board 74 are arranged at positions as near the battery pack 50 as possible in the interior of the apparatus body 20.

By arranging the heavy components in the apparatus body 20 on the side where the battery pack 50 is mounted, the center of gravity of the tablet terminal 10 as a whole may be placed as close to the battery pack 50 as possible. Accordingly, when the user grips the battery pack 50, the user is allowed to hold the tablet terminal 10 stably with a smaller gripping force by supporting the position near the center of gravity.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A tablet terminal comprising:
a rectangular apparatus body including a front side, a back side opposite the front side, and a perimeter side that extends between the front side and the back side;
a touch-screen display unit disposed at and forming a portion of the front side of the rectangular apparatus body; and
a battery pack including a battery cell incorporated therein and including a rounded outer shape,
wherein the battery pack is mounted on the perimeter side of the rectangular apparatus body in an arrangement in which the display unit and the battery cell do not overlap with each other and such that a front side of the battery pack appears to be part of the front side of the rectangular apparatus body.

2. The tablet terminal according to claim 1, wherein the battery cell includes a cylindrical shape, and the battery pack includes an outer shape rounded corresponding to the roundness of the outer shape of the battery cell.

3. The tablet terminal according to claim 1, wherein the perimeter side is on a downside in the direction of gravitational force when the electronic apparatus is supported.

4. The tablet terminal according to claim 1, wherein the perimeter side is a long side of the apparatus body.

5. The tablet terminal according to claim 1, further comprising:
a connector configured to electrically connect the battery pack to the apparatus body,
wherein a housing of the apparatus body includes a protruding portion protruding so as to cover the connector.

6. The tablet terminal according to claim 5, wherein the connector is provided at a center of the battery pack in the longitudinal direction.

7. The tablet terminal according to claim 5, wherein a pair of wall members configured to clamp the connector of the battery pack from the longitudinal direction of the battery pack are provided on both sides of a connector of the apparatus body.

8. The tablet terminal according to claim 1, wherein a shoulder portion extending in the longitudinal direction of the battery pack is provided at a portion where the battery pack is connected to the apparatus body.

9. The tablet terminal according to claim 8, wherein the shoulder portion is an inclined surface formed on a back surface of the battery pack.

10. The tablet terminal according to claim 1, further comprising:
a supporting member provided on the apparatus body and configured to support the apparatus body so as not to slip on a surface where the apparatus body is placed, wherein the supporting member includes a curved portion curved corresponding to the roundness of the battery pack.

11. The tablet terminal according to claim 10, wherein the supporting member is an elastic body.

* * * * *